US010358206B2

(12) United States Patent
Toral Vázquez et al.

(10) Patent No.: US 10,358,206 B2
(45) Date of Patent: Jul. 23, 2019

(54) DEVICE FOR A PROPELLER BLADE

(71) Applicants: AIRBUS OPERATIONS S.L., Getafe (ES); AIRBUS OPERATIONS (S.A.S.), Toulouse (FR)

(72) Inventors: Javier Toral Vázquez, Getafe (ES); Diego Folch Cortes, Getafe (ES); Esteban Martino González, Getafe (ES); Pablo Goya Abaurrea, Getafe (ES); Vasillis Votsios, Getafe (ES); Michel Fouinnetau, Toulouse (FR); Sylvain Roumegas, Toulouse (FR)

(73) Assignees: Airbus Operations, S.L., Getafe (Madrid) (ES); Airbus Operations (S.A.S.), Toulouse (FR)

( * ) Notice: Subject to any disclaimer, the term of this patent is extended or adjusted under 35 U.S.C. 154(b) by 498 days.

(21) Appl. No.: 14/975,338

(22) Filed: Dec. 18, 2015

(65) Prior Publication Data

US 2016/0185465 A1 Jun. 30, 2016

(30) Foreign Application Priority Data

Dec. 29, 2014 (EP) .................................... 14200416

(51) Int. Cl.
*B64C 11/20* (2006.01)
(52) U.S. Cl.
CPC ..................... *B64C 11/20* (2013.01)
(58) Field of Classification Search
CPC ......... B64C 11/20; F01D 21/045; F01D 21/14
USPC .......................................................... 415/9
See application file for complete search history.

(56) References Cited

U.S. PATENT DOCUMENTS

| 2,182,812 | A | * | 12/1939 | Lougheed | .......... | B29D 99/0025 |
| | | | | | | 264/258 |
| 2,202,013 | A | * | 5/1940 | Lougheed | ............... | B29C 70/20 |
| | | | | | | 139/425 R |
| 2,202,014 | A | * | 5/1940 | Lougheed | ............... | B64C 11/20 |
| | | | | | | 156/148 |
| 3,229,931 | A | * | 1/1966 | Larsen | .................. | B64C 27/006 |
| | | | | | | 244/141 |

(Continued)

FOREIGN PATENT DOCUMENTS

| JP | 2009 035161 A | 2/2009 |
| WO | WO 99/20491 A1 | 4/1999 |
| WO | WO 00/66429 A1 | 11/2000 |

OTHER PUBLICATIONS

Extended European Search Report for Application No. 14 20 0416 dated May 28, 2015.

(Continued)

*Primary Examiner* — Jason D Shanske
*Assistant Examiner* — Brian Christopher Delrue
(74) *Attorney, Agent, or Firm* — Jenkins, Wilson, Taylor & Hunt, P.A.

(57) ABSTRACT

A self-destruction device adapted to be installed in a propeller blade, the self-destruction device including a detector adapted to detect a release of the propeller blade, a warning mechanism adapted to send a release alarm in the event of the detector detecting release of the propeller blade, and a destruction mechanism adapted to destroy the propeller blade in the event of receiving a release alarm from the warning mechanism. An engine and an aircraft are also provided.

14 Claims, 6 Drawing Sheets

(56) References Cited

U.S. PATENT DOCUMENTS

| | | | | |
|---|---|---|---|---|
| 3,352,513 | A | * | 11/1967 | Baker .................. B64C 27/006 244/140 |
| 3,778,008 | A | | 12/1973 | Ingham et al. |
| 3,912,200 | A | * | 10/1975 | Foral .................... B64C 27/006 244/17.11 |
| 3,926,388 | A | | 12/1975 | Johnson et al. |
| 4,026,660 | A | * | 5/1977 | Ueda .................... B64C 27/007 416/226 |
| 6,305,905 | B1 | * | 10/2001 | Nagle ................... B64C 11/04 416/204 R |
| 7,065,469 | B2 | * | 6/2006 | Samata ................ G01M 15/12 702/183 |
| 7,195,198 | B2 | * | 3/2007 | Boice ................... B64C 27/006 244/17.11 |
| 7,484,924 | B2 | | 2/2009 | Soupizon |
| 8,864,465 | B2 | * | 10/2014 | Viegas .................... F01D 5/282 416/2 |
| 9,284,843 | B2 | * | 3/2016 | Koch, IV ............... B64D 27/12 |
| 9,714,085 | B2 | * | 7/2017 | White .................... B64C 27/006 |
| 2004/0161331 | A1 | * | 8/2004 | Binetruy .............. F01D 21/045 415/9 |
| 2006/0013687 | A1 | * | 1/2006 | Gaiani ................... B64C 11/02 416/61 |
| 2006/0080010 | A1 | | 4/2006 | Gaiani |
| 2009/0104030 | A1 | * | 4/2009 | McMillan .............. G01N 24/08 415/200 |
| 2011/0150649 | A1 | * | 6/2011 | White .................. B64C 27/006 416/61 |
| 2016/0186722 | A1 | * | 6/2016 | Olesen ................... F03D 17/00 416/1 |
| 2017/0175714 | A1 | * | 6/2017 | Asheim .................. F03D 17/00 |

OTHER PUBLICATIONS

Park et al.: "*Resistencia a Daños Grandes en Aeronautica*" (title translated into English: [Damage Resistance to Large Aircraft]), XVII Reunión de Usuarios de Abaqus (title translated into English: [XVII Meeting of Abaqus User Groups]), pp. 1-13, SENER Engineering and Systems, Barcelona, Spain.

Interview Summary for European Application No. 14200416.7 dated Dec. 18, 2017.

\* cited by examiner

DEVICE FOR A PROPELLER BLADE

CROSS-REFERENCE TO RELATED APPLICATION

This application claims the benefit of and priority to European patent application No. 14200416.7 filed on Dec. 29, 2014, the entire disclosure of which is incorporated by reference herein.

TECHNICAL FIELD

The present disclosure belongs to the field of engines with unducted propeller blades, and more particularly to the blades comprised therein.

BACKGROUND

Blades comprised in propellers and fans usually work under severe conditions. The design parameters and security margins are carefully set, but it is not impossible that a blade may break and release from the hub. In this case, the blade may impact on other blades or on other parts of the aircraft, causing some damage to them.

Some aircraft are powered by engines which comprise unducted propeller blades. These engines are joined to the aircraft structure by pylons. They can be located in the wing section, under a high wing for example, or on the rear end of the fuselage. In the latter case, the pylons which support these engines are usually not very long, so the engines and thus the propeller blades are located in close proximity to the fuselage structure. A blade release or rupture can therefore be critical in these cases, as it can cause damage to the fuselage structure or even to the opposite engine.

The solutions proposed in the state of the art include the reinforcement of the fuselage in the parts that are predictably impacted by a blade which is released from a propeller. However, this solution pose a weight increase in the aircraft structure and a not very secure position, as a released blade at high speed may draw a not very predictable trajectory. Weight is a critical issue in aircraft design, so this drawback is very important in this technical field.

SUMMARY

The present disclosure provides solution for the aforementioned problem, by a self destruction device according to claim 1, a propeller blade according to claim 8, an engine according to claim 12 and an aircraft according to claim 13. In dependent claims, preferred embodiments of the disclosure herein are defined.

In a first inventive aspect, the disclosure herein provides a self-destruction device adapted to be installed in a propeller blade, the self-destruction device comprising:

a detector adapted to detect a release of the propeller blade;

a warning mechanism adapted to send a release alarm in the event of the detecting detecting release of the propeller blade; and a destruction mechanism adapted to destroy the propeller blade in the event of receiving a release alarm from the warning mechanism.

This self-destruction device is suitable for being installed in a propeller blade, providing a way to break it into pieces if necessary.

In an embodiment, the detector comprises at least one calibrated accelerometer.

In an embodiment, the detector comprises a circuit arranged along the span of the propeller blade, so that an eventual blade release would cause the opening of the circuit and the alarm release by the warning mechanism.

In a particular embodiment, the destruction mechanism comprises at least one explosive load.

In a particular embodiment, the destruction mechanism comprises a plurality of explosive loads. In a particular embodiment, the explosive loads are arranged covering the whole span of the propeller blade. In a particular embodiment, the explosive loads are explosive wires.

Having a plurality of explosive loads instead of only one provides several advantages. On the one hand, the released/broken blade is broken into more pieces than in the case of having only one explosive load. These smaller pieces will impact the fuselage, but the energy of these impacts will be much lower than in the case of bigger ones. On the other hand, this solution allows dividing the total explosive load into several smaller ones, so that each explosion involves a lower energy. When using this disclosure herein in blades which operate very close to the fuselage structure it is important to ensure that the energy of each explosion is lower than the impact energy the whole blade or blade piece would cause if no such a device were used.

In an embodiment, the destruction mechanism comprises a device for initiating a shock wave.

In a second inventive aspect, the disclosure herein provides a propeller blade comprising a self-destruction device according to the first inventive aspect.

Advantageously, a propeller blade comprising such a self-destruction mechanism is suitable for being destroyed when partially or totally released, in such a way that the destruction of the released blade or portion is always less harmful to the fuselage than the impact of the released blade or portion.

In an embodiment, the detector comprises a plurality of accelerometers arranged along the span of the propeller blade.

Advantageously, locating an accelerometer near the tip of the propeller blade ensures that both a partial break and a total release of the propeller blade is detected by the detector, and therefore the destruction mechanism achieves the aim of avoiding a big piece of the propeller blade reaches the fuselage.

In an embodiment, the propeller blade is made of a fiber composite material and the destruction mechanism comprises or consists of explosive wires which are interwoven with the fibers of the composite material.

Advantageously, this embodiment ensures a destruction of the blade, as the fibers of the composite material provides the main mechanical properties to the propeller blade.

In an embodiment, the propeller blade comprises a skin and reinforcing elements, and the destruction mechanism is located next to the reinforcing elements.

In an embodiment, the propeller blade comprises a skin, an annular spar which extends substantially along the span of the propeller blade and foam to cover the inner space of the skin and the annular spar, and the destruction mechanism comprises or consists of explosive wires which are located following a spiral shape around the annular spar.

In an embodiment, the propeller blade comprises a skin, an annular spar which extends substantially along the span of the propeller blade and foam to cover the inner space of the skin and the annular spar, and the destruction mechanism comprises or consists of explosive wires which are located next to the annular spar.

In particular embodiments, both the detector and the destruction mechanism are disposed in an area delimited or defined by the reinforcing elements. In particular embodiments, both the detector and the destruction mechanism are outside an area delimited or defined by the reinforcing elements.

Advantageously, these embodiments ensure the destruction of the blade, as the destruction mechanism is located next to the elements which provide the main mechanical properties to the propeller blade.

In a particular embodiment, the detector comprises a circuit that is arranged along the span of the propeller blade, and part of the circuit is arranged in the propeller hub.

In a third inventive aspect, the disclosure herein provides an engine comprising a propeller blade according to the second inventive aspect.

In a fourth inventive aspect, the disclosure herein provides an aircraft comprising an engine according to the third inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the disclosure herein will become clearly understood in view of the detailed description of the disclosure herein which becomes apparent from a preferred embodiment of the disclosure herein, given just as an example and not being limited thereto, with reference to the drawings.

DETAILED DESCRIPTION

A self-destruction device according to the disclosure herein comprises:
a detector adapted to detect a release of the propeller blade;
a warning mechanism adapted to send a release alarm in the event of the detector detecting release of the propeller blade; and
a destruction mechanism adapted to destroy the propeller blade in the event of receiving a release alarm from the warning mechanism.

Figure 1:
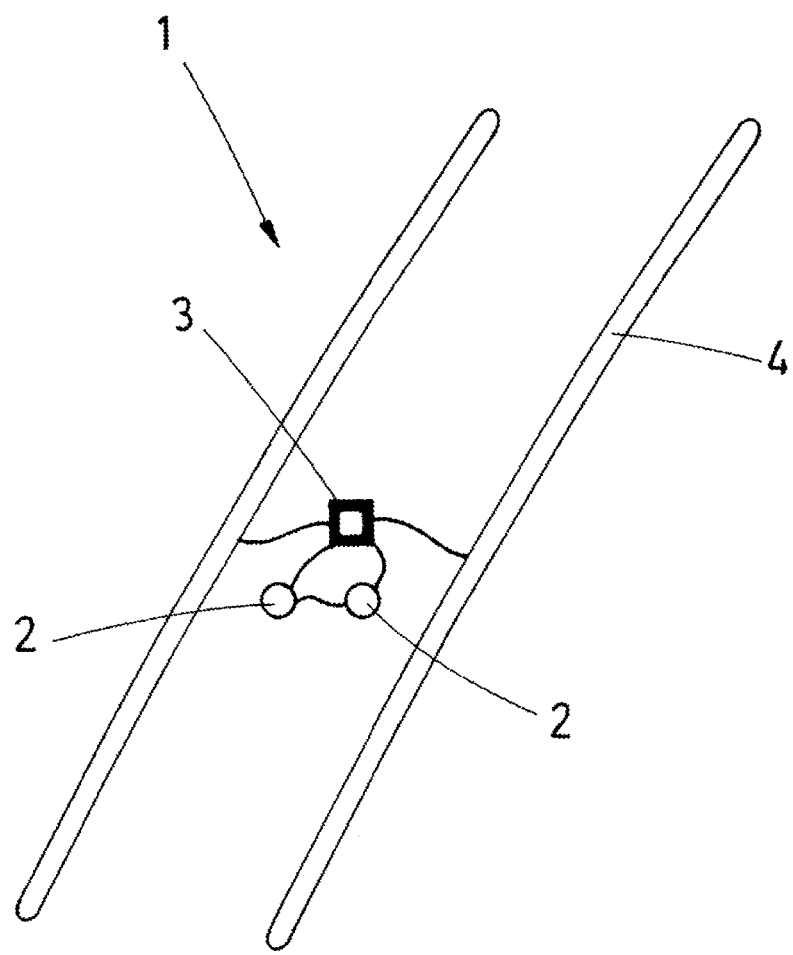
FIG. 1. This figure shows a first embodiment of a self-destruction device for a propeller according to the disclosure herein.

In the embodiment shown in FIG. 1, the detector (2) of the self-destruction device (1) comprises a plurality of accelerometers and the destruction mechanism (4) comprises or consists of two explosive wires, which are connected to the accelerometers by the warning mechanism (3). In the event that a blade is partially or totally released, the detector would detect an acceleration vector with a component that is greater than a predetermined trigger value which is not due to the acceleration of braking in a rotational movement, and as a consequence, the warning mechanism (3) would activate the destruction mechanism (4). The accelerometers are previously calibrated to set a suitable trigger value, over which the warning mechanism (3) activates the destruction mechanism (4).

Figure 2:
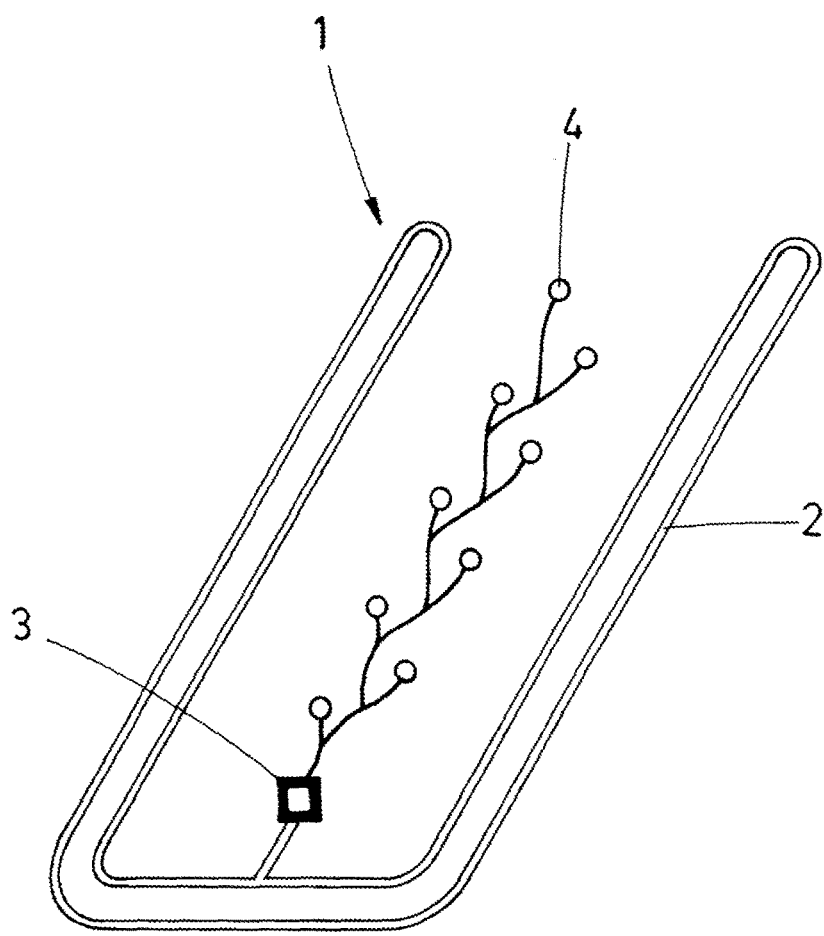
FIG. 2. This figure shows a second embodiment of a self-destruction device for a propeller according to the disclosure herein.

In the embodiment shown in FIG. 2, the detector (2) is an electric circuit. One part of the circuit is intended to be placed in the part of the blade which is expected to be released, and the other part of the circuit is intended to be placed in the propeller hub, which is not intended to be released. In the event of a blade release, the circuit would become open, and the warning mechanism (3), detecting the condition of open circuit, would activate the destruction mechanism (4). In this embodiment, the destruction mechanism (4) comprises a plurality of explosive loads which are arranged linearly. In different embodiments, the explosive loads are arranged according to different patterns. Being that the detector is suitable for being placed along the whole span of a rotor blade, it allows the detection of both a total release and a partial break of the blade.

In another embodiment, the destruction mechanism is intended to initiate a shockwave when being activated. This embodiment is particularly suitable for a blade with a monolithic structure, as shockwaves are particularly effective for destroying this kind of blade.

Any combination of detector and destruction mechanism are suitable for being present in different embodiments of self-destruction mechanisms according to this disclosure herein.

In a particular embodiment, the propeller blade is made of composite material, and the destruction mechanism comprises or consists of explosive wires which are interwoven with the fabrics of the composite material of the blade. In a particular embodiment, the blade comprises an annular spar covering the whole blade span, and the destruction mechanism is located next to the annular spar. In a further particular embodiment, the destruction mechanism is explosive wires which are located following a spiral shape around the annular spar.

Figure 3:
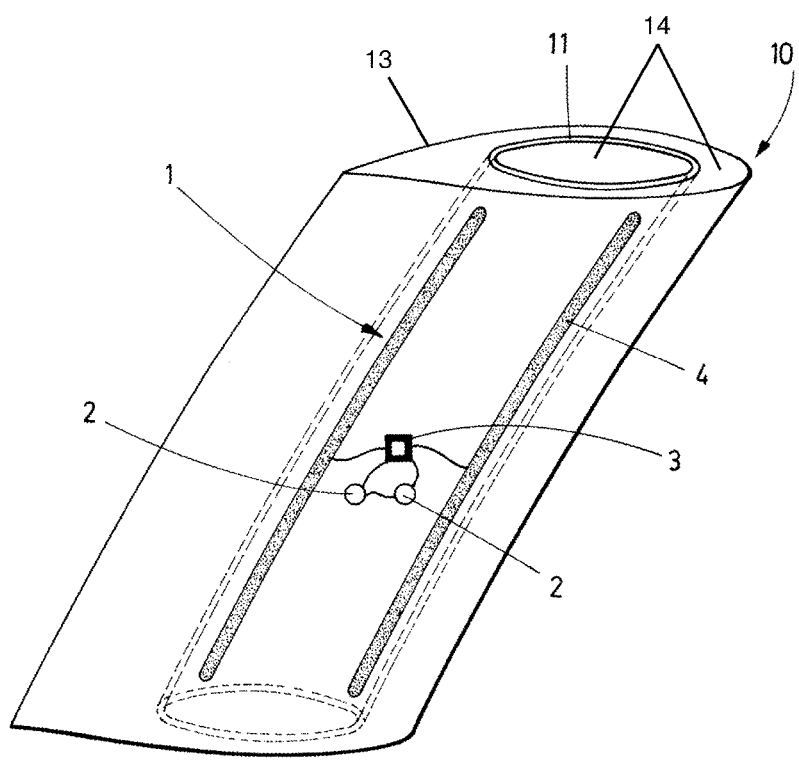
FIG. 3. This figure shows a propeller blade comprising a first embodiment of a self-destruction device for a propeller according to the disclosure herein.

FIG. 3 show a propeller blade (10) comprising self-destruction mechanism generally designated (1) according to the embodiment shown in FIG. 1. The destruction mechanism (4) comprises or consists of explosive wires arranged along the span of the propeller blade (10). In this particular embodiment, the propeller blade comprises a skin (13), an annular spar (11) which extends substantially along the span of the propeller blade (10) and foam (14) to cover the inner space of the skin and the annular spar (11), and the explosive wires are located inside of the reinforcement zone of the propeller blade. In this particular embodiment, the detector (2) comprises a plurality of accelerometers arranged along the span of the propeller blade (10). At least one of them is located near the tip of the propeller blade (10), so that both a partial break and a total release of the propeller blade (10) are detected by the detector (2).

Figure 4:
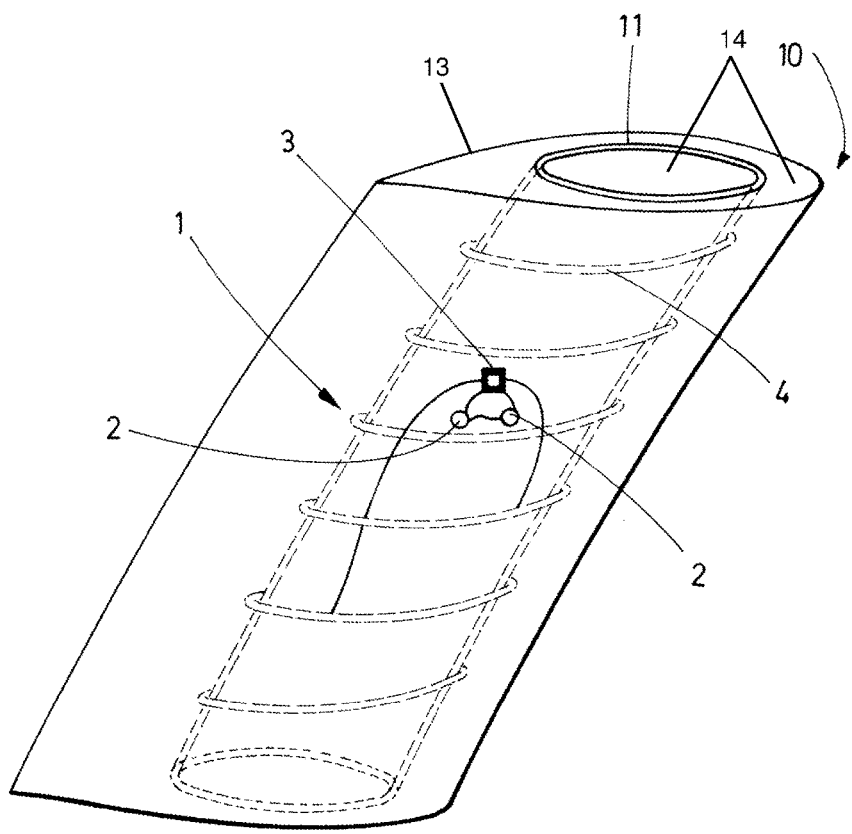
FIG. 4. This figure shows a propeller blade comprising a second embodiment of a self-destruction device for a propeller according to the disclosure herein.

FIG. 4 shows another propeller blade comprising a self-destruction mechanism according to the embodiment shown in FIG. 1. In the embodiment shown in this figure, the propeller blade (10) comprises a skin (13), an annular spar (11) which extends substantially along the span of the propeller blade (10) and foam (14) to cover the inner space of the skin and the annular spar (11), and the destruction mechanism (4) comprises explosive wires which are located following a spiral shape around the annular spar (11). In this particular embodiment, the detector (2) comprises a plurality of accelerometers arranged along the span of the propeller blade (10). At least one of them is located near the tip of the propeller blade (10), so that both a partial break and a total release of the propeller blade (10) are detected by the detector (2). In a different embodiment, not shown, the destruction mechanism (4) comprises explosive wires which are located following a spiral shape in the inner side of the annular spar (11).

Figure 5:
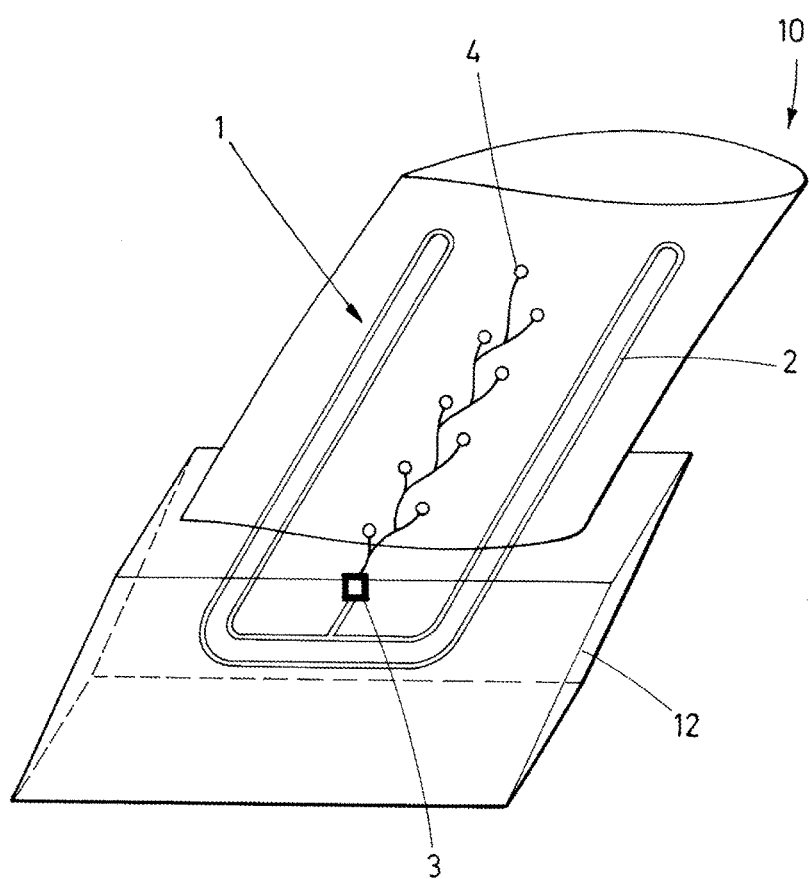
FIG. 5. This figure shows a propeller blade comprising a third embodiment of a self-destruction mechanism for a propeller according to the disclosure herein.

FIG. 5 show a propeller blade (10) comprising a self-destruction mechanism generally designated (1) according to the embodiment shown in FIG. 2. One part of the circuit is placed in the part of the propeller blade (10) which is expected to be released, which means that part of the circuit is placed in the half of the blade which is further from the hub (12), and the other part of the circuit is placed in the propeller hub (12), which is not intended to be released.

Figure 6:
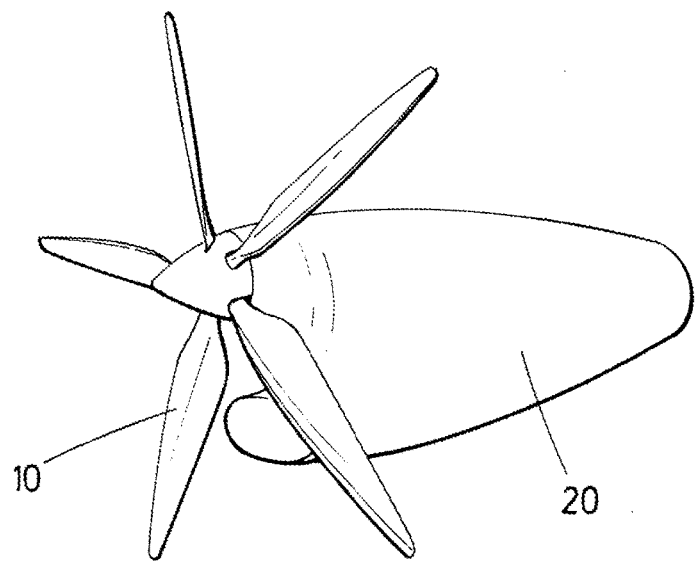
FIG. 6 This figure shows an engine according to the disclosure herein.

FIG. 6 shows an engine (20) comprising a propeller blade according to the one shown in FIG. 3.

Figure 7:
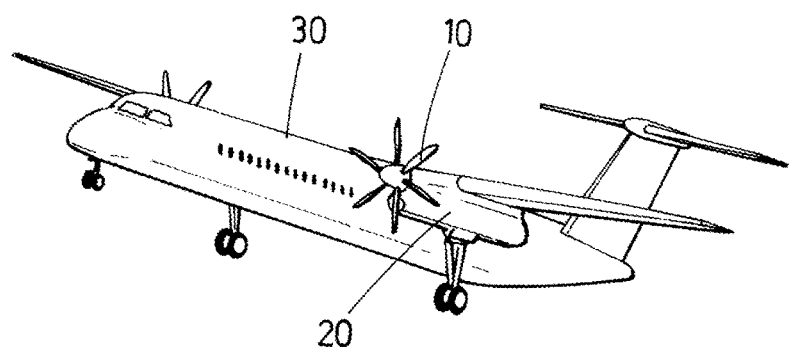
FIG. 7 This figure shows an aircraft according to the disclosure herein.

FIG. 7 shows an aircraft (30) comprising an engine (20) as shown in FIG. 5.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A self-destruction device adapted to be installed in a propeller blade comprising a skin, at least one reinforcement comprising an annular spar extending substantially along a span of the propeller blade, and a foam that covers an inner space of the skin and the annular spar, the self-destruction device comprising:
    a detector adapted to detect a release of the propeller blade;
    a warning mechanism adapted to send a release alarm when the detector detects a release of the propeller blade; and
    a destruction mechanism adapted to destroy the propeller blade upon receiving the release alarm from the warning mechanism, the destruction mechanism comprising explosive wires located adjacent the annular spar, such that the foam is arranged between and separates the explosive wires from the skin of the propeller blade,
    wherein the detector comprises a circuit arranged along a span of the propeller blade, so that an eventual blade release causes an opening of the circuit and a sending of a release alarm by the warning mechanism.

2. The self-destruction device according to claim 1, wherein the detector comprises at least one calibrated accelerometer.

3. The self-destruction device according to claim 1, wherein the destruction mechanism is configured to initiate a shock wave when activated.

4. The self-destruction device according to claim 1, wherein the destruction mechanism comprises a plurality of explosive loads.

5. The self-destruction device according to claim 4, wherein the plurality of explosive loads are arranged covering substantially a whole span of the propeller blade.

6. The self-destruction device according to claim 4, wherein the explosive loads are explosive wires.

7. The self-destruction device according to claim 1, wherein the explosive wires are wrapped around the annular spar in a spiral shape.

8. A propeller blade comprising:
    a skin;
    at least one reinforcement comprising an annular spar that extends substantially along a span of the propeller blade;
    a foam that covers an inner space of the skin and the annular spar; and
    a self-destruction device comprising:
        a detector adapted to detect a release of the propeller blade;
        a warning mechanism adapted to send a release alarm in the event of the detector detecting release of the propeller blade; and
        a destruction mechanism adapted to destroy the propeller blade upon receiving the release alarm from the warning mechanism, the destruction mechanism comprising explosive wires located adjacent the annular spar, such that the foam is arranged between and separates the explosive wires from the skin of the propeller blade,
        wherein the detector comprises a circuit arranged along a span of the propeller blade, so that an eventual blade release causes an opening of the circuit and a sending of a release alarm by the warning mechanism.

9. The propeller blade according to claim 8, wherein the detector comprises a plurality of accelerometers arranged along a span of the propeller blade.

10. The propeller blade according to claim 8, wherein the destruction mechanism is located next to the annular spar.

11. The propeller blade according to claim 10, wherein the explosive wires are wrapped around the annular spar in a spiral shape.

12. The propeller blade according to claim 8, wherein the detector comprises a circuit arranged along a span of the propeller blade, part of the circuit being arranged in a propeller hub.

13. An engine comprising a propeller blade according to claim 8.

14. An aircraft comprising an engine according to claim 13.

* * * * *